(12) United States Patent  
Hattori (10) Patent No.: US 8,368,942 B2  
(45) Date of Patent: Feb. 5, 2013

(54) IMAGE PROCESSING APPARATUS AND ITS PROGRAM AND CONTROL METHOD

(75) Inventor: Yusuke Hattori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1173 days.

(21) Appl. No.: 11/482,885

(22) Filed: Jul. 7, 2006

(65) Prior Publication Data

US 2007/0013974 A1   Jan. 18, 2007

(30) Foreign Application Priority Data

Jul. 11, 2005   (JP) .................................. 2005-202254

(51) Int. Cl.  
*H04N 1/387* (2006.01)

(52) U.S. Cl. ....... 358/1.18; 358/453; 358/461; 358/486; 358/514; 358/448; 382/167; 382/274; 382/282; 382/284; 382/319; 382/321; 382/289; 382/173; 382/293; 382/298; 345/649; 345/619; 345/620; 345/621; 345/622

(58) Field of Classification Search .................. None  
See application file for complete search history.

(56) References Cited

U.S. PATENT DOCUMENTS

| 4,823,289 | A | * | 4/1989 | Hirosawa et al. | 396/551 |
| 4,947,269 | A | * | 8/1990 | Yamada | 358/448 |
| 5,974,199 | A | * | 10/1999 | Lee et al. | 382/289 |
| 6,304,683 | B1 | * | 10/2001 | Kiyohara et al. | 382/317 |
| 6,956,587 | B1 | * | 10/2005 | Anson | 345/649 |
| 7,945,116 | B2 | * | 5/2011 | Curtis | 382/282 |
| 2001/0048447 | A1 | * | 12/2001 | Jogo | 345/620 |
| 2002/0048413 | A1 | * | 4/2002 | Kusunoki | 382/282 |
| 2003/0026605 | A1 | * | 2/2003 | Misumi et al. | 396/1 |
| 2005/0281462 | A1 | * | 12/2005 | Ghosh et al. | 382/173 |

FOREIGN PATENT DOCUMENTS

| JP | 11-203411 A | 7/1999 |
| JP | 2002-010059 A | 1/2002 |

* cited by examiner

*Primary Examiner* — Steven Kau  
*Assistant Examiner* — Pawandeep Dhingra  
(74) *Attorney, Agent, or Firm* — Canon USA, Inc., IP Divison

(57) ABSTRACT

An image processing apparatus has a multi-cropping function that automatically crops the scanned images of a plurality of original sheets placed on a platen of an image reading apparatus all at one pass. The desired number of cropped images is input by the user, and the number of cropped images detected when cropping the image of the original sheets placed on the platen, are compared.

16 Claims, 10 Drawing Sheets

*601* FORM

INPUT SETUP

| | |
|---|---|
| INPUT TYPE: | PLATEN GLASS ▼ |
| ORIGINAL SHEET SIZE: | WHOLE AREA OF PLATEN ▼ |
| WIDTH: 21.59   HEIGHT: 29.70 | CENTIMETERS ▼ |
| MULTI-CROPPING: THE NUMBER OF CROPPED IMAGES [ ] | APPLY   RESET |

OUTPUT SETUP

| | |
|---|---|
| COLOR MODE: | COLOR ▼ |
| OUTPUT RESOLUTION: | 300 ▼ dpi |
| OUTPUT SIZE: | FREE SIZE ▼ |
| WIDTH: 21.59   HEIGHT: 29.70 | 100 — % |
| DATA SIZE: | 25.59 MB |

IMAGE SETUP

| | |
|---|---|
| AUTOMATIC COLOR ADJUSTMENT: | OFF ▼ |
| EDGE ENHANCEMENT: | ON ▼ |
| MOIRE REDUCTION: | OFF ▼ |
| SPECKLE REDUCTION: | OFF ▼ |
| COLOR FAILURE CORRECTION: | OFF ▼ |
| GRAINY EFFECT REDUCTION: | OFF ▼ |
| CALIBRATION SETUP | ⯆ |

Tabs: BASIC MODE | EXTENSION MODE

IMAGE PROCESSING APPARATUS AND ITS PROGRAM AND CONTROL METHOD

BACKGROUND OF THE INVENTION

1. Field of the Invention

The present invention relates to an image processing apparatus that scans an original sheet set on a platen of an image reading apparatus, and that processes and outputs the scanned image. Especially, the present invention relates to the image processing apparatus that scans a plurality of original sheets placed on the platen all in one pass and can produce an output for each one of the original sheets.

2. Description of the Related Art

Currently, as a device for digitalizing the data of paper media and bring the digitalized data into a personal computer (PC), an image reading apparatus such as imaging scanner or multifunction peripheral is known. These image reading apparatuses can scan various kinds of original sheets, such as monochromatic image of text data, colored images in magazines, developed photographs, negatives, and positives.

On the other hand, multi-cropping is known as a convenient function to scan a small-sized original sheet such as L-ban (3.5×5 inches) photograph. The multi-cropping performs pre-scanning after a plurality of original sheets are placed on the platen of the image reading apparatus. Then, a number of original sheets and their positions are automatically detected by the pre-scanning, and a plurality of original sheets are cropped as images. This is followed by main scanning that generates image data to output the image of the original sheet to a PC screen or storage medium. By this function, the plurality of original sheets can be automatically scanned as separate images.

Further, as discussed in Japanese Patent Application Laid-Open No. 2002-10059, when a plurality of original sheets are placed on the platen, the original sheets are automatically detected, and according to various modes such as aligning, the image is output to a paper.

In the case of scanning the original sheets by using the multi-cropping function, a pre-determined space is required between the original sheets. However, it becomes difficult for the user to properly arrange the original sheets and secure the space when the number of original sheets to be placed increases, which may result in inaccurate cropping.

Moreover, if an original sheet includes both texts portion and photograph portion, an improper edge can be detected which is recognized as a separate original sheet, and ends up being scanned as a separate image.

SUMMARY OF THE INVENTION

The present invention is directed to providing an image processing apparatus having a multi-cropping function that can accurately detect and scan the number of cropped images desired by the user, and to offering a control method and program of the image processing apparatus.

According to an aspect of the present invention, an image processing apparatus having a function for automatically cropping an image of a plurality of original sheets placed on a platen. The apparatus includes a scanning unit that scans the original sheets on the platen; an inputting unit that inputs the number of images to be cropped by the scanning unit; a detecting unit that detects the number of cropped images when executing cropping by the scanning unit; a comparing unit that compares the number of images input by the inputting unit and the detected number of images; and a displaying unit that displays contents according to the comparison result of the comparing unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments of the invention and, together with the description, serve to explain the principles of the invention.

DETAILED DESCRIPTION OF THE EXEMPLARY EMBODIMENTS

Exemplary embodiments of the invention will be described in detail below with reference to the drawings.

First Exemplary Embodiment

Figure 1:
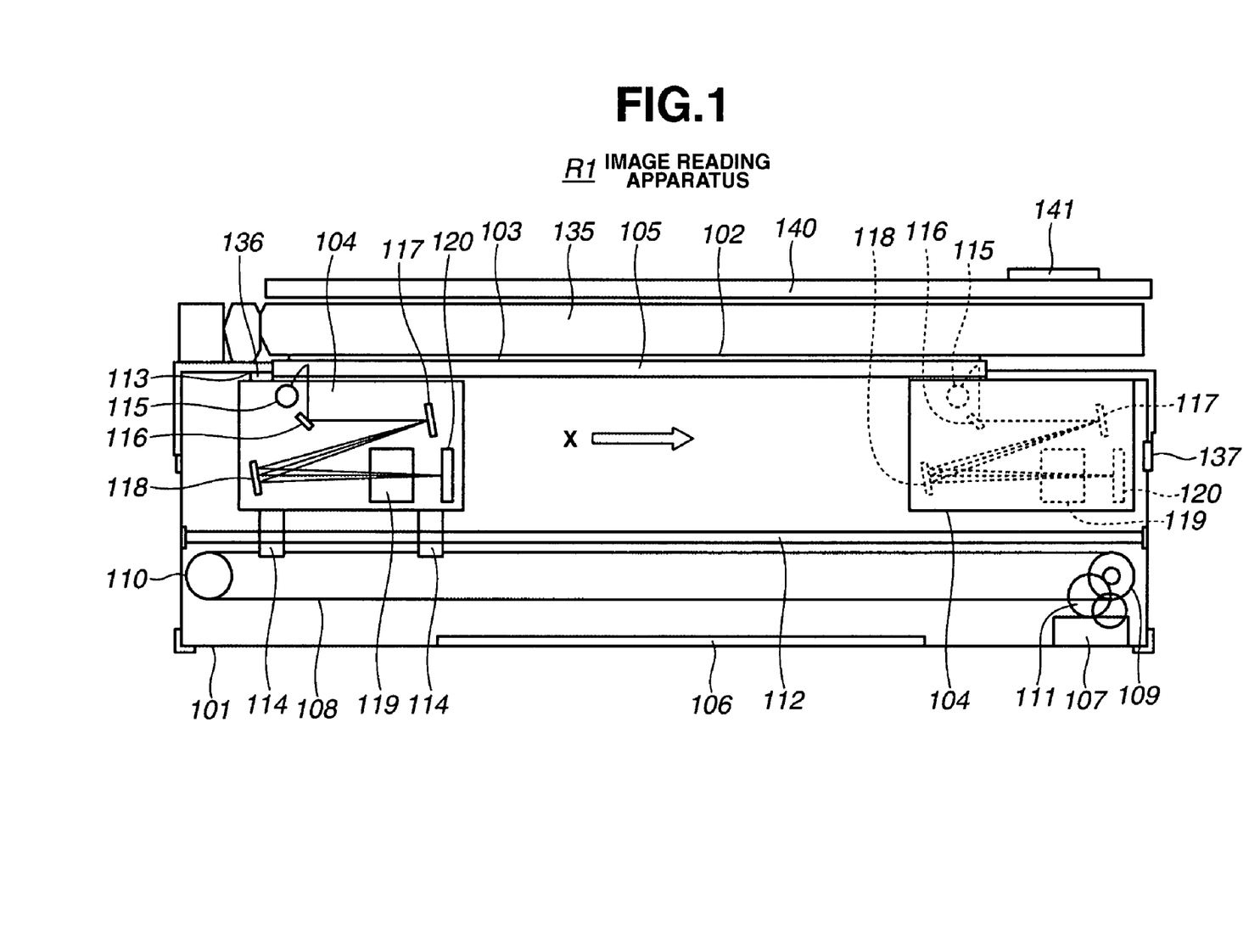
FIG. 1 is a cross-sectional view of the image reading apparatus of the first exemplary embodiment of the present invention.

FIG. 1 is a cross-sectional view of the image reading apparatus R1 of the first exemplary embodiment of the present invention. The image reading apparatus R1 includes a scanner 101 having a film scanner function. The scanner 101 is connected to the host computer 221 (hereinafter referred to as host PC) (see FIG. 2) by an interface cable (not illustrated), and includes an optical unit 104, platen glass 105, an electronic board 106, a pulse motor 107, an endless belt 108, pulleys 109 and 110, gear trains 111, a guide rail 112, a white reference plate 113, light source 135 for transparent original sheet, and a pressure plate 140.

An original sheet 103 is placed between the platen glass 105 and a lower surface 102 of the light source 135 for transparent original sheet. The scanner 101 decides the scanning area based on a black mark 136 inside the white reference plate 113, and scans an image of the original sheet 103. The optical unit 104 and the pulse motor 107 are electrically connected by cables (not illustrated) respectively. The optical unit 104 is disposed on a disposing unit 114, which is slidable along the guide rail 112. The disposing unit 114 is secured to the endless belt 108.

The optical unit 104 is configured of a reflective original sheet light source 115, a plurality of reflective mirrors 116, 117 and 118, an imaging lens 119, and a line sensor 120 serving as an imaging sensor.

Scanning operation of a reflective original sheet using the scanner 101 is next described. When the host PC 221 (from FIG. 2) generates a scanning command, the scanner 101 starts the scanning operation. The scanner 101 turns on the reflective original sheet light source 115 of the optical unit 104, and the reflected lights from the original sheet are reflected by the plurality of mirrors 116, 117 and 118, and are imaged at the line sensor 120 through the imaging lens 119. Thus, one line of the image in a main scan direction is scanned.

The endless belt 108 is driven by a force of the pulse motor 107 through rotation of the pulley 109 via the gear trains 111. In this way, the optical unit 104 secured to the disposing unit 114 moves along the guide rail 112 in a sub-scan direction indicated by an arrow X.

The scanner 101 repeats the scanning operation of the line images in the main scan direction while moving the optical unit 104 in the sub-scan direction. The scanner 101 scans a whole surface of the platen glass 105 moving the optical unit 104 and performing the scanning to the position indicated in the dotted line of FIG. 1. However, the scanner 101 can also partially scan the original sheet on the platen glass 105 depending on the contents of the scanning command from the host PC 221. In this case, the scanning image area is specified by the host computer 221, and the system controller 226 (FIG. 2) of electronic substrate 106 defines a pixel area to be employed from among the outputs of the line sensors 120 in the main scan direction, and in the sub-scan direction, defines the moving area of the optical unit 104. Thus, the partial image on the original sheet placed on the platen glass 105 can be scanned.

The scanning operation of a transparent original sheet using the scanner 101 is next described in accordance with the first exemplary embodiment. The scanner 101 turns off the reflective original sheet light source 115 of the optical unit 104, turns on the light source 135 for transparent original sheet, moves the optical unit 104 to a transparent original sheet scanning position, reflects the original sheet transparent lights from the light source 135 for transparent original sheet via the plurality of mirrors 116, 117 and 118. The original sheet transparent lights are imaged at the line sensor 120 through the imaging lens 119, and thus, one line of the image in the main scan direction is scanned.

Further, the endless belt 108 is driven by the force of the pulse motor 107 through rotation of the pulley 109 via the gear trains 111. In this way, the optical unit 104 secured to the endless belt 108 via the disposing unit 114 moves along the guide rail 112 in the sub-scan direction indicated by the arrow X.

The scanner 101 repeats the scanning operation of the line images in the main scan direction while moving the optical unit 104 in the sub-scan direction. The scanner 101 scans the whole surface of the platen glass 105 moving the optical unit 104 and performing the scanning to the position indicated in the dotted line of FIG. 1.

However, the scanner 101 can also partially scan the original sheet on the platen glass 105 depending on the contents of the scanning command from the host PC 221. In this case, the scanning image area is specified by the host computer 221. The pixel area to be employed from among the outputs of the line sensors 120 is defined in the main scan direction. In the sub-scan direction, the system controller 226 (FIG. 2) of electronic substrate 106 defines the moving area of the optical unit 104. When the optical unit 104 is moved in the sub-scan direction, the system controller 226 selects a speed according to the resolution setting of the image scanning that is specified by the host PC 221, and the image is scanned.

The operation panel 141 is disposed on the pressure plate 140. The operation panel 141 is provided with a display screen 501 and button 502 (refer to FIG. 5). The user can input the multi-cropping parameters to the scanner 101 in the operation panel 141, and the scanning operation and the like can be started.

Figure 2:
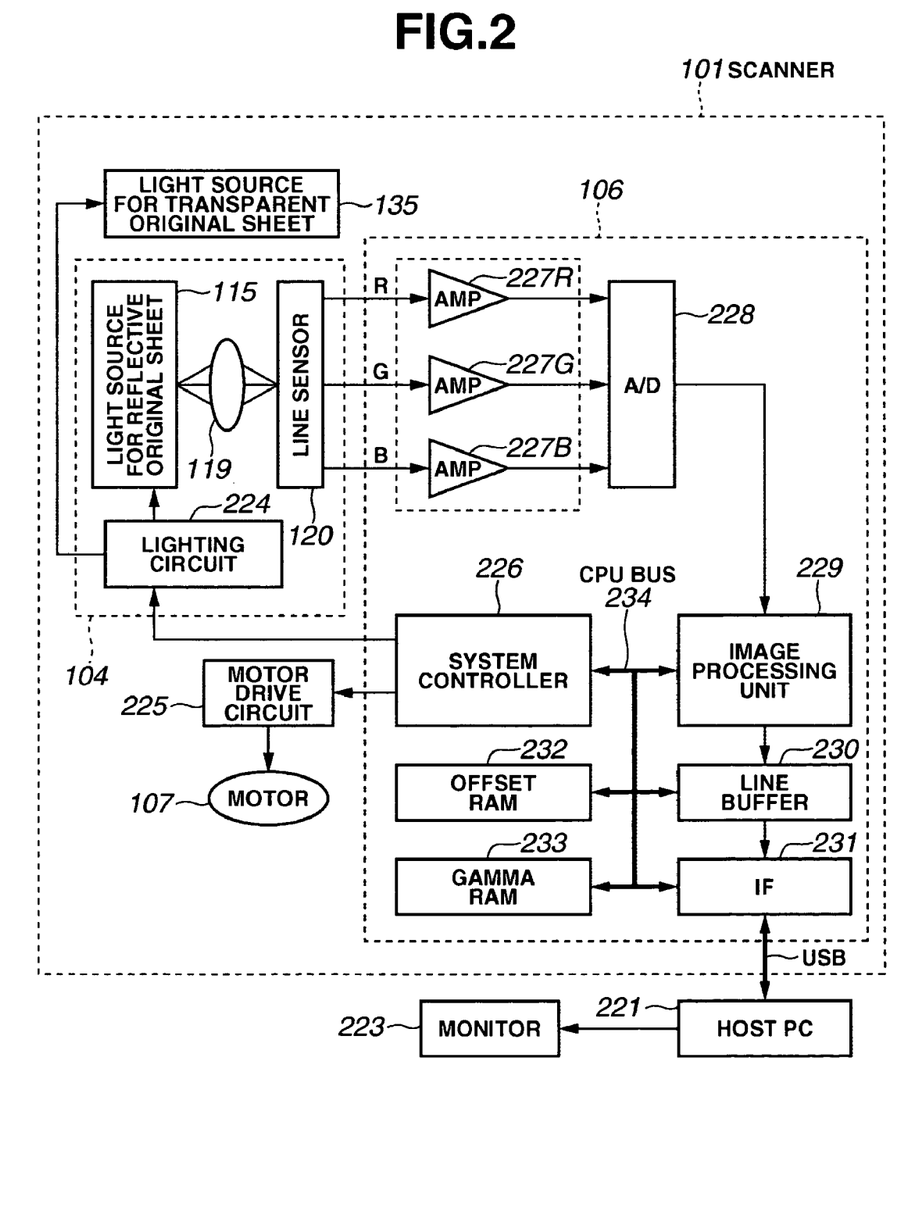
FIG. 2 is a block chart showing functional components of the scanner in accordance with the first exemplary embodiment.

FIG. 2 is the block chart showing functional components of the scanner 101 in accordance with the first exemplary embodiment. The same number of components as in FIG. 1 are used to represent the same components, and their descriptions are not repeated. The scanner 101 includes the optical unit 104, the electronic board 106, the motor 107, the light source 135 for transparent original sheet, and the motor drive circuit 225.

The optical unit 104 has a light source lighting circuit 224. The light source lighting circuit 224 is configured to turn on the light source 115 for reflective original sheet and the light source 135 for transparent original sheet. The light source lighting circuit 224 includes a detecting unit for detecting amount of lights of the light sources. If a cold-cathode electrode tube is used for the light source 115 for reflective original sheet and the light source 135 for transparent original sheet, a so-called inverter circuit is constituted.

The electronic board 106 includes a system controller 226, analog gain adjusters 227R, 227G, and 227B, an A/D converter 228, an image processing unit 229, a line buffer 230, an interface (I/F) unit 231, an offset RAM 232, a gamma RAM 233, and a system bus 234.

The analog gain adjusters 227R, 227G, and 227B perform adjustable amplification of analog image signals output from the line sensor 120.

The A/D converter 228 converts the analog image signals output by the variable analog gain adjusters 227R, 227G, and 227B to digital image signals. The image processing unit 229 performs to the digitalized image signals the following image processing: offset correction, shading correction, digital gain adjustment, color balance adjustment, masking, resolution change in main and sub-scan directions, and image compression.

The line buffer 230 temporarily stores the image data and has a general-purpose random access memory. The interface unit 231 communicates with the host PC 221. In this example, the USB interface is employed, however, other interfaces can also be employed such as IEEE1394.

The offset RAM 232 is used as a working area for processing images. Because the RGB line sensors are arranged with the pre-determined offset values and parallel to the line sensor 120, the offset RAM 232 is used to correct the offset between these RGB lines. Further, the offset RAM 232 temporarily stores various data such as shading compensation. In the present exemplary embodiment, the offset RAM 232 is configured by the general-purpose random access memory. Gamma RAM 233 stores a gamma curve, and performs gamma correction.

The system controller 226 stores the whole sequence of the scanner 101, and performs various controls according to the commands from the host PC221. The system bus 234 having an address bus and data bus connects the system controller 226, the image processing unit 229, the line buffer 230, the interface unit 231, the offset RAM 232 and the gamma RAM 233. The motor drive circuit 225 is employed for the pulse motor 107 and outputs an excitation switching signal of the pulse motor 107 based on the signal from the system controller 226.

Figure 3:
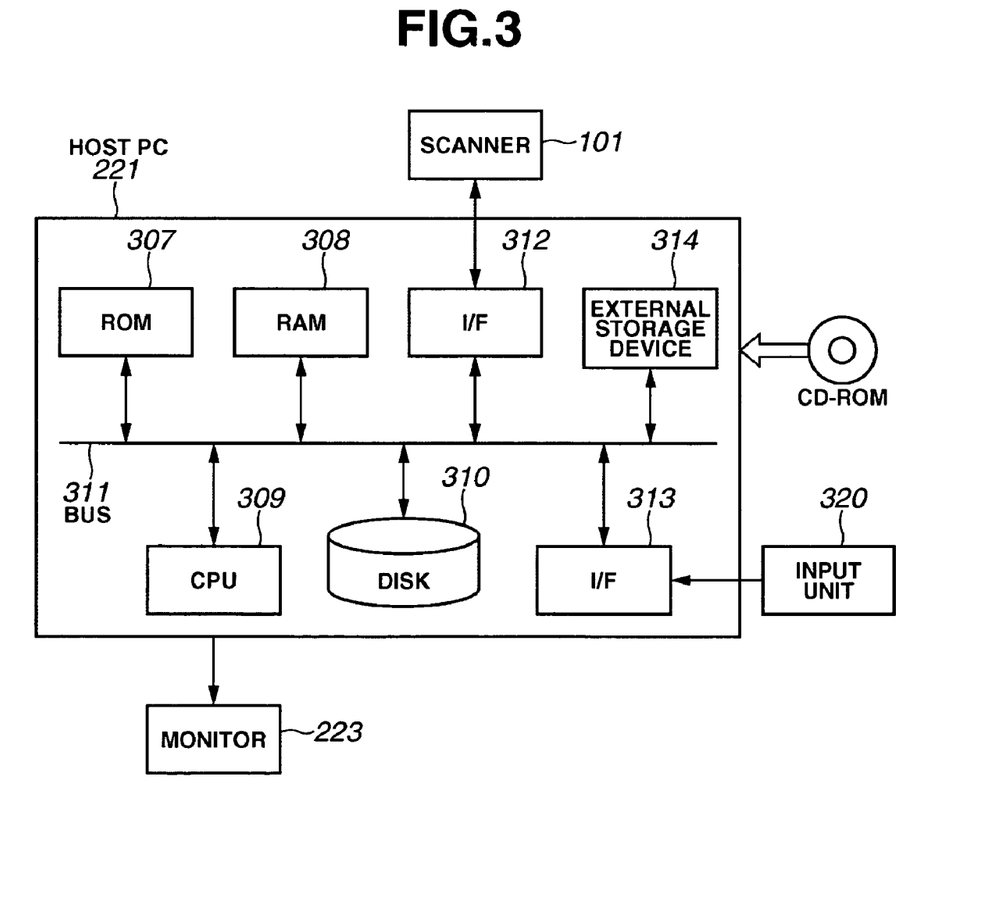
FIG. 3 is a chart showing a configuration in a general host PC used to control the scanner in accordance with the first exemplary embodiment.

FIG. 3 is the outline of the typical host PC 221 used to control the scanner 101 in accordance with the first exemplary embodiment. The host PC221 includes a ROM 307, a RAM 308, a central processing unit 309, a disk apparatus 310, a bus 311, I/F 312, I/F 313, and an external storage device 314. The ROM 307 has a program to implement the operation of flowchart of FIG. 4. The RAM 308 provides a work area and storage area required in operating the above program. The central processing unit 309 performs processing in accordance with the program stored on the ROM 307.

Bus 311 connects the components described above to enable data transfer between them. I/F 312 communicates with the scanner 101, which is achieved by the USB interface similar to the I/F unit 231 of the scanner 101. Other interfaces such as IEEE 1394 can also be employed. I/F 313 is connected to the input units 320 such as a mouse and keyboard. The external storage device 314 drives the external storage medium such as flexible disk or CD-ROM. Instead of previously storing the control program on the ROM 307 as described above, the program can be read and downloaded from the external memory medium. Alternatively, the control program can be downloaded through the network via the network connector that is not illustrated. Further, the monitor 223 displays the image cropped by the scanner 101 or the image data of the scanned original sheet.

Figure 4:
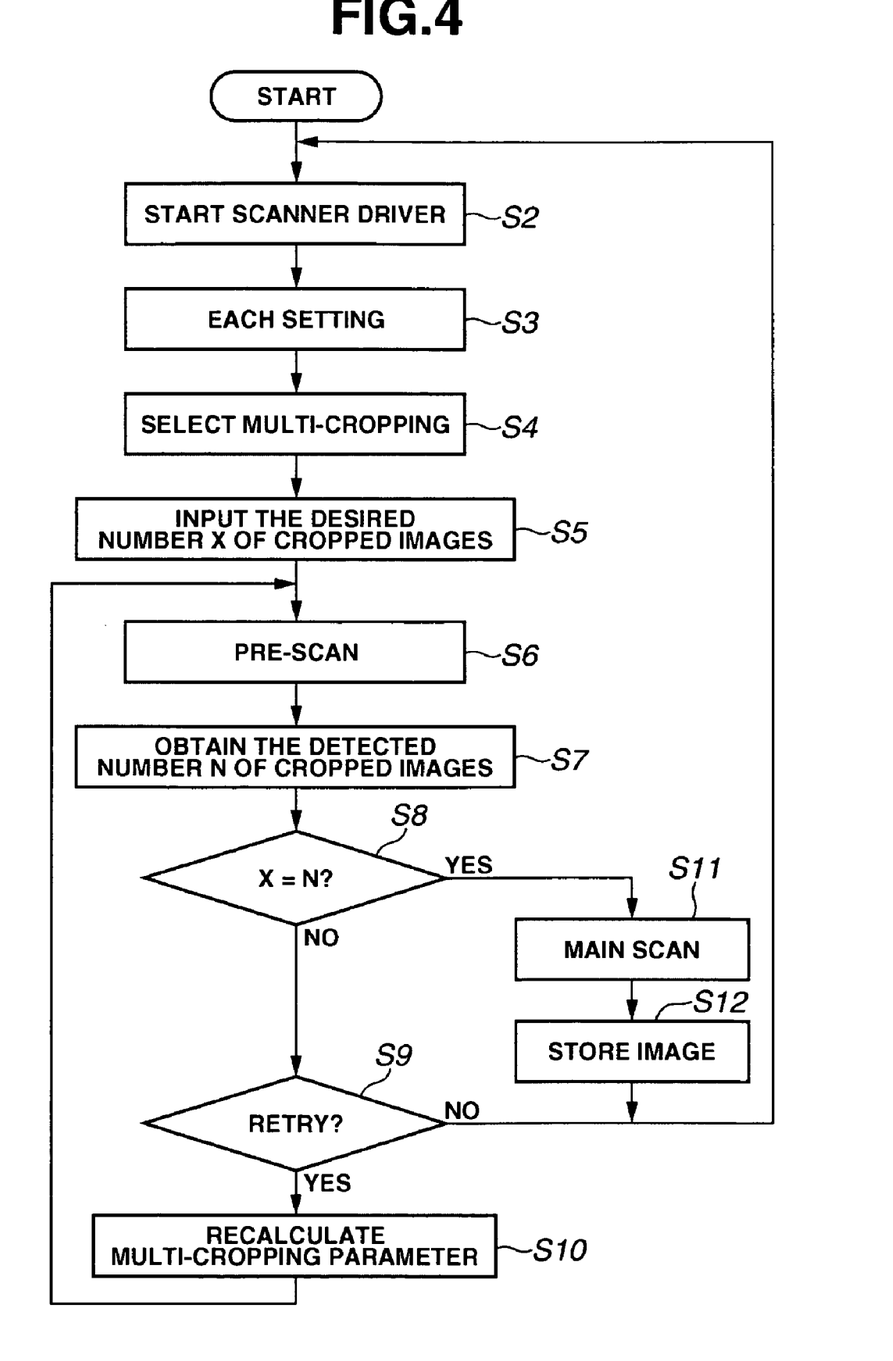
FIG. 4 is a flowchart showing scanning operation by the host PC in accordance with the first exemplary embodiment.

Next, the scanning operation of the scanner 101 controlled by the host PC 221 is described in accordance with the first exemplary embodiment. FIG. 4 is a flow chart that shows the scanning operation of the scanner 101 controlled by the host PC221 in accordance with the first exemplary embodiment.

The scanning operation of the scanner 101 includes the pre-scanning that crops the images of the plurality of original sheets placed on the platen, and the main scanning that generates the image data desired by the user. The image data desired by the user is the data that gives the resolution, the size, the trim, and the color correction, that are desired by the user. In the multifunction peripheral including a scanner and printer, the main scanning generates data not only to display it on the monitor 223 but also to print it on the storage medium.

To begin with, the user places an original sheet on the platen glass 105. A plurality of original sheets are placed on the platen in the case of employing the multi-cropping function. When scanning an original sheet that is smaller in size than the platen, if the text portion of the original sheet should be automatically cropped, a single original sheet can be placed on the platen, and scanned by employing the multi-cropping function.

In step S2, a scanner driver for scanning the original sheet is initialized at the host PC 211 based on the user's operation. In step S3, various scanning setups such as scanning resolution and color mode are made based on the user's input. In step S4, the multi-cropping is set ON based on the user's input. In this stage, the main scanning operation can be performed if the user sets OFF the multi-cropping. This step is omitted in the flow chart.

In step S5, after placing the original sheets on the platen, the user inputs the desired number X of cropped images from an operation panel 141 on the scanner 101 or from the user interface of the driver application. Here, a value of the desired number X of cropped images is a whole number greater than 0.

Figure 5:
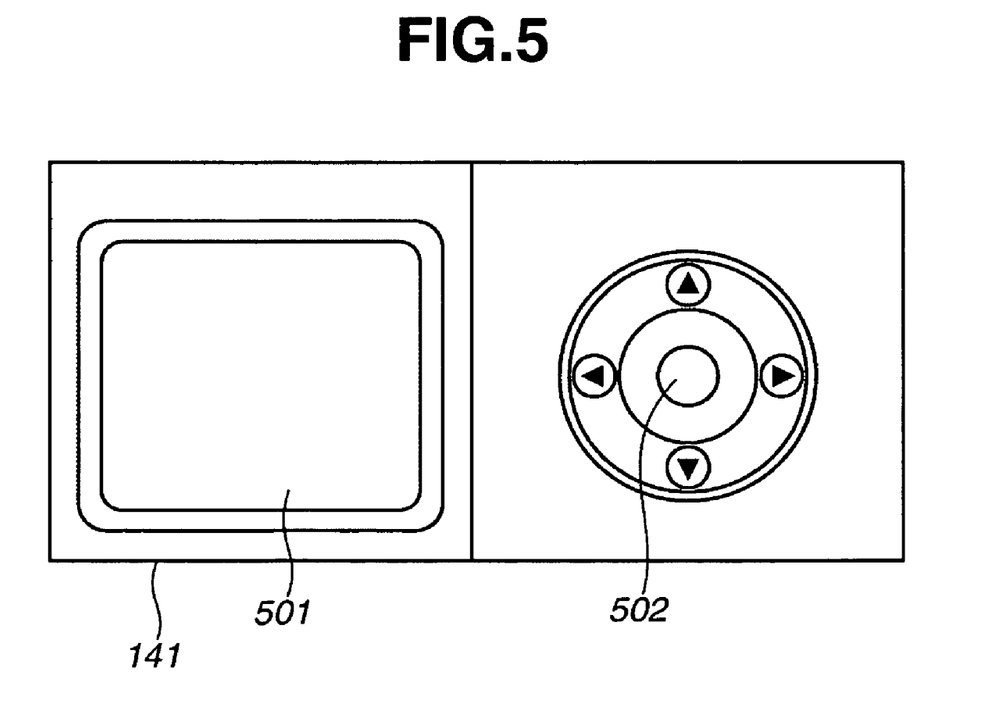
FIG. 5 shows an operation panel for a user to input the desired number of cropped images from a main body of the image scanning apparatus.

FIG. 5 shows the operation panel 141 on the main body of the scanner 101 with which the user inputs the desired number of cropped images. The operation panel 141 includes a liquid crystal panel 501 and button 502. The value of the desired number X of cropped images is input by the user using the button 502. In this case, the value is displayed on the liquid crystal panel 501.

Figure 6:
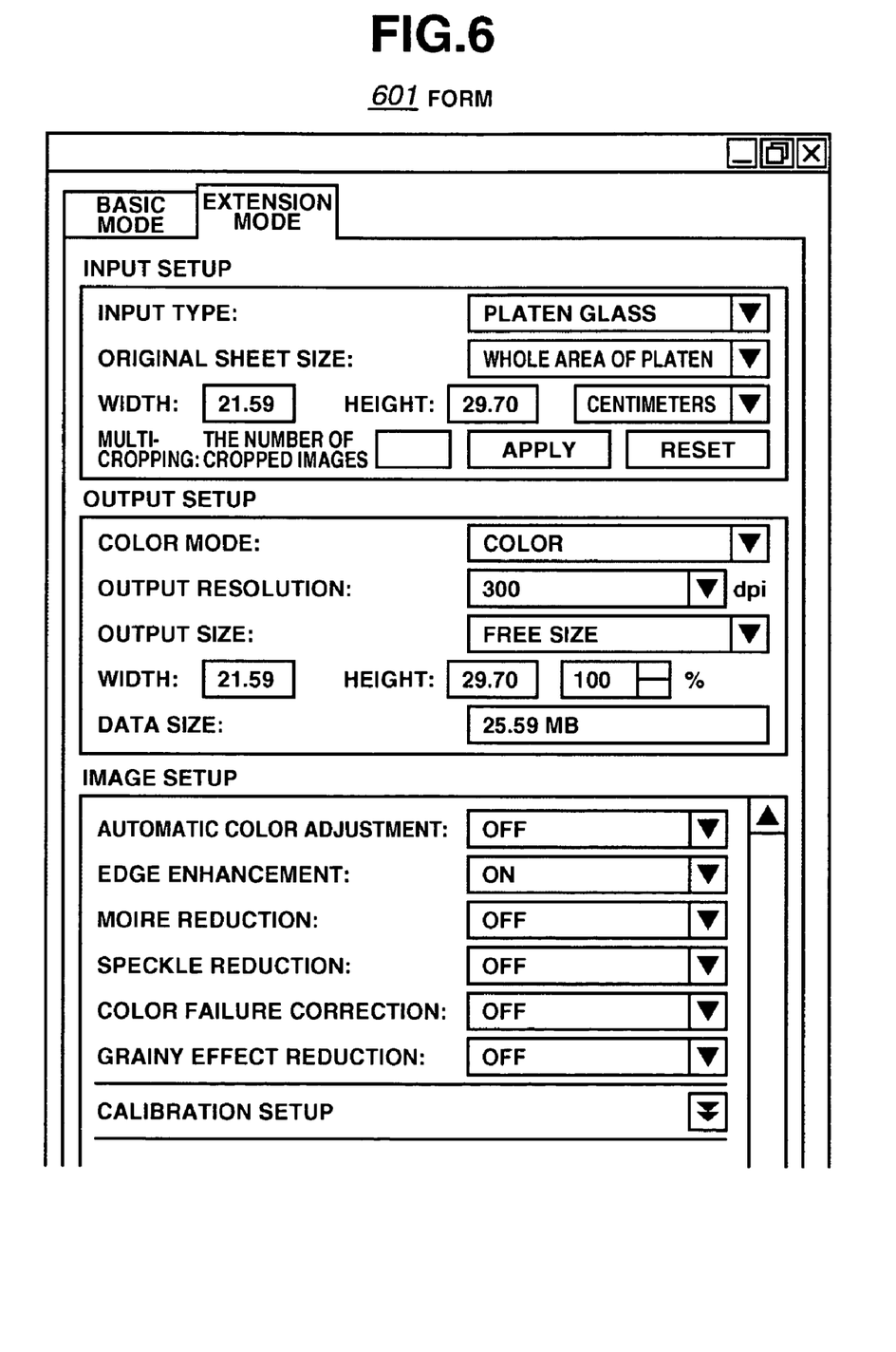
FIG. 6 shows a form in accordance with the first exemplary embodiment.

On the other hand, the form 601 of FIG. 6 shows an example where the desired number X of cropped images is input from the user interface of the driver application. A numerical value is input to the form 601 of FIG. 6 based on the user's operation and the value is set.

In step S6, the start of pre-scanning is instructed based on the user's operation. The scanner 101 scans the original sheet responding to this instruction. The host PC 211 detects the number of original sheets placed on the platen based on the scanned image data, and calculates the detected number N of cropped images (step S7).

Figure 7:
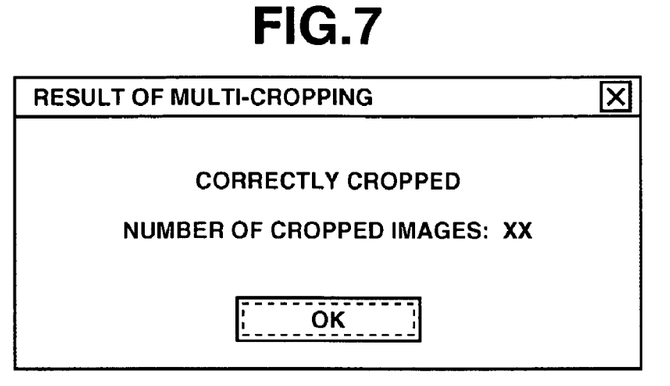
FIG. 7 is an example of a dialog displayed on the monitor, in accordance with the first exemplary embodiment.

In step S8, the desired number X of cropped images desired by the user, and the actually detected number N of cropped images, are compared. If the desired number X of cropped images and the detected number N of cropped images are the same, the multi-cropping is decided to be successful, and the dialog of "correctly cropped" is displayed on the monitor 223. FIG. 7 is an example of the dialog displayed on the monitor 223 in accordance with the first exemplary embodiment.

Then, the main scanning operation is performed (step S11), and the cropped images are respectively stored (step S12). In this case, after the successful multi-cropping is performed, the main scanning may continue without displaying the "correctly cropped" dialog.

Figure 8:
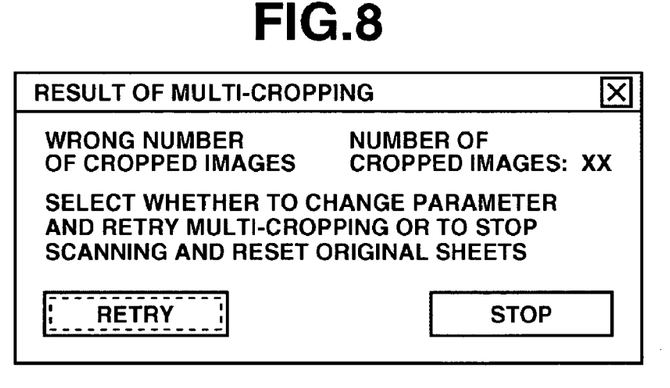
FIG. 8 is an example of a dialog that prompts the user to select one of "retrying pre-scanning" and "stopping the scan to reset the original sheets", in accordance with the first exemplary embodiment.

FIG. 8 is an example of the dialog that prompts the user to select one of "retry pre-scanning" and "stop scanning to reset the original sheets" in accordance with the first exemplary embodiment. In step S8, if the desired number X of cropped images and the detected number N of cropped image are different, the multi-cropping parameters are adjusted. FIG. 8 is one example of the dialog that prompts the user to select one of "retry pre-scanning" and "stopping the main scanning to reset the original sheets", which is displayed on the monitor 223 (step S9). It should be noted that the multi-cropping parameters include threshold values such as scanning resolution and edge detection.

In step S9, in the case of retrying, the multi-cropping parameters are automatically or manually changed in step S10. Then, the process returns again to step S6, and pre-scanning operation is performed. The multi-cropping parameters to be changed include threshold values such as scanning resolution and edge detection as above described.

Figure 9:
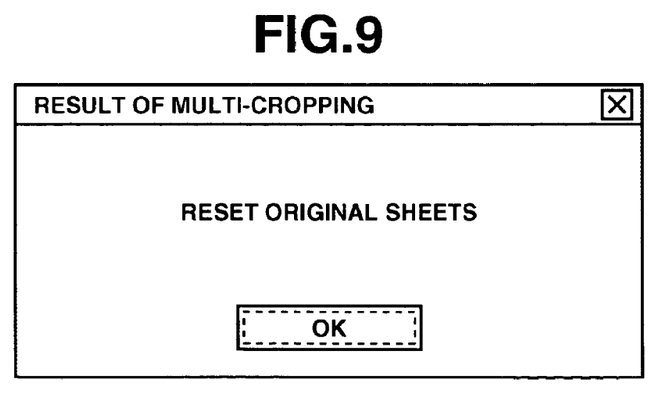
FIG. 9 is an example of a dialog that prompts the user to reset the original sheets in accordance with the first exemplary embodiment.

On the other hand, in step S9, in the case of stopping the scanning, the process returns to start, and the user resets the original sheets. At this time, the most likely location of the detection error is displayed on the driver application screen. At the same time, the dialog prompting the user to reset the original sheets is displayed, as shown in the example of FIG. 9.

Figure 10:
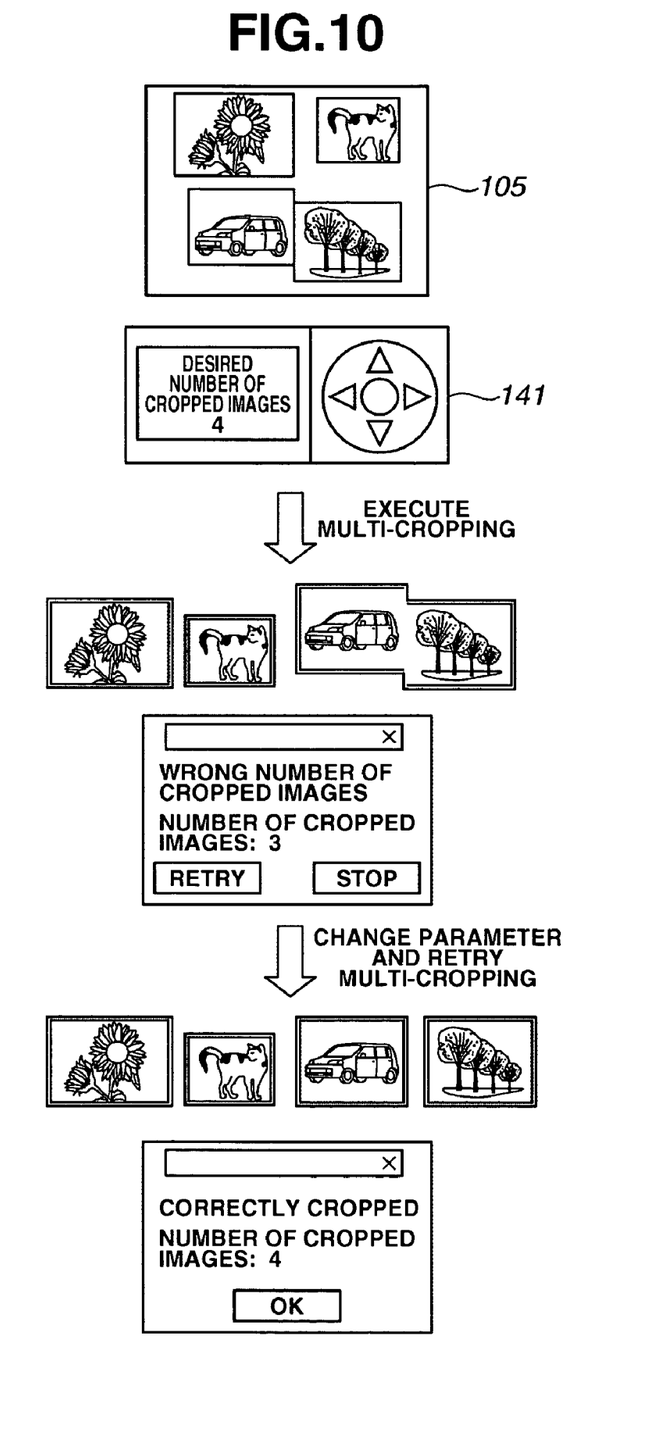
FIG. 10 shows a situation where four photographs are placed by the user and enough space for detection is not given between two of them.
Figure 11:
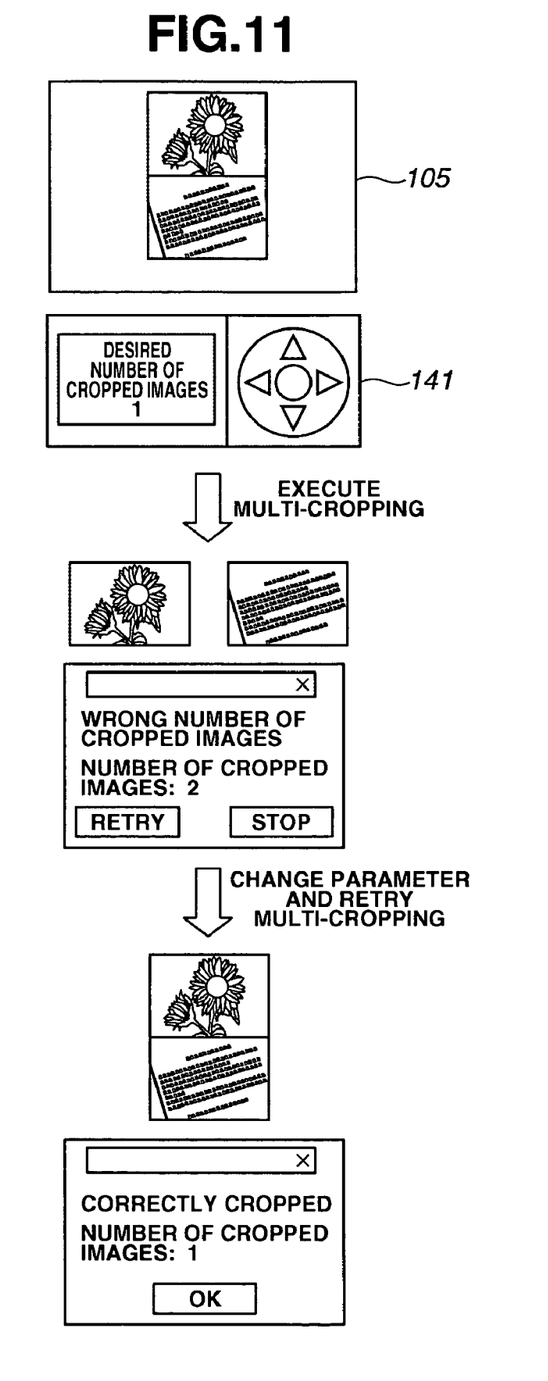
FIG. 11 is an operation sequence in the case where an original photograph and texts are placed on the platen, and the user desires to crop and store them as a single image.
Figure 12:
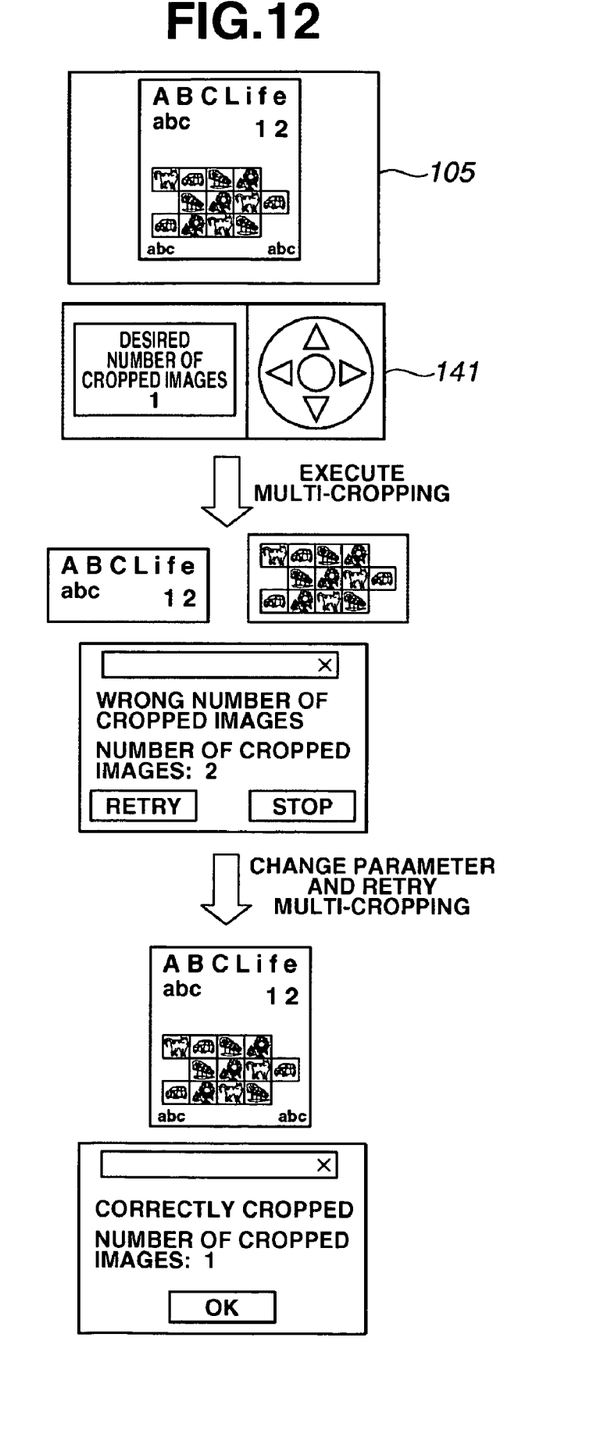
FIG. 12 shows the case where a single original sheet that includes both photographs and texts such as a magazine page is placed on the platen, and the user desires it to be correctly cropped and to be stored as a single image.

FIGS. 10, 11 and 12 show specific examples. FIG. 10 describes the case where four original photographs are set by the user, and in this situation, enough spacing necessary for the detection is not given between two of the original photographs. As shown in FIG. 10, it is assumed that the user placing the photographs on the platen desires that four photographs are correctly extracted as four images. However, among the four photographs, two of them are too closely placed together without allowing a sufficient space between them which is required for detection.

The user places four photographs on the platen glass 105, and inputs "4" as the desired number X of cropped images, and the pre-scanning is performed. Since enough space required for cropping is not present between two photographs, the two photographs are cropped as one photograph. Hence, in the first pre-scanning, the detected number of cropped image N is "3". It is to be noted that the meaning of a term "crop" above is to detect the photograph region of the scanned image of the original photographs set on the whole plane of the platen, and to trim the detected portion.

Because the desired number X of cropped images and the detected number N of cropped images differ from one another, the dialog indicating "wrong number of cropped images" appears as shown in FIG. 8. Then, the user selects retry, and changes the multi-cropping parameters. When the re-scanning is performed once again, the detected number N of cropped images is now "4", and cropping has been accurately performed. Then, as shown in FIG. 7, the dialog indicating "correctly cropped" is displayed, the main scanning takes place, and the images are stored. Also in this case, while the successful multi-cropping is performed, the main scanning may continue without displaying the dialog indicating "correctly cropped".

When the dialog shown in FIG. 8 is displayed and "stop scan" is selected, the cropped region where a cropping error has occurred is generally not rectangular, so that the cropped region that is not rectangular is displayed as the likely location of the cropping error by the driver application. Moreover, the dialog shown in FIG. 9 is displayed to prompt the user to reset the photographs.

FIG. 11 describes the case where the original photograph and the original texts are set on the platen glass 105 by the user who wishes them to be cropped and stored as one image. The user inputs "1" as the desired number X of cropped images, and the pre-scanning is performed. In the normal pre-scanning process, the photographs and texts are often cropped as different images. Hence, in the first pre-scanning, the originals are cropped as two images (the detected number N of cropped images is "2"). Because the desired number X of cropped images and the detected number N of cropped images differ from one another, the dialog showing "wrong number of cropped images" is displayed as shown in FIG. 8.

Then, retry is selected, the multi-cropping parameters (such as scanning resolution and edge detection threshold values) are adjusted, and the pre-scanning is performed again. In this way, the photographs and the texts are cropped as a single image, and can be stored as one image. Thus, the images can be combined together according to the user's intention.

FIG. 12 describes the case where the original sheet including the photographs and the texts, like a page on the magazine, is set by the user on the platen glass 105, who desires to correctly crop and store the original sheet as one image. The user inputs "1" as the desired number X of cropped images, and the pre-scanning is performed. In the normal pre-scanning, the photograph portion and texts portion are cropped as separate original sheets, and are scanned and stored as two images. In this case, in the first pre-scanning, the detected number N of cropped images is "2". Therefore, the number is different from the desired number X of cropped image so that the dialog indicating "wrong number of cropped images" is displayed as shown in FIG. 8.

The user can select retry and change multi-cropping parameters for pre-scanning once more and a single image is correctly cropped to be stored as a single image. Input of the desired number X of cropped images by the user is not prerequisite so that input operation can be omitted in the first pre-scanning, and the normal pre-scanning process can be performed. The user can decide whether to change the number of cropped images based on the scanning result (the detected number of cropped images).

Second Exemplary Embodiment

The second exemplary embodiment of the present invention is applicable to a system configured of a plurality of devices (for example, a host computer, an interface device, a scanner, a printer, and a copier). Moreover, the storage medium that stores the program code or software that achieves the functions of the above exemplary embodiment can be supplied to the system or apparatus and a computer (CPU or MPU) of the system or the apparatus may read the program code stored in the storage media and execute the program code.

In other words, the present exemplary embodiment shows examples of a program executable by computer. The user places a plurality of original sheets on a platen of an image processing apparatus. The program that controls the image processing apparatus provided with a multi-cropping function that automatically crops each one of the scanned original sheets, includes a detecting step that detects the number of cropped images when cropping the original sheets placed on the platen, a comparing step that compares the desired number of cropped images input by the user and the detected number of cropped image, and a displaying step that displays the comparison result of the comparing step.

Here, the program codes read from the storage medium achieves the functions of the above exemplary embodiments. The storage medium that stores the program codes constitutes the present invention. Further, there is a case where not only the functions of the exemplary embodiments described above are achieved by executing the program codes read by the computer but also the operating system (OS) that is running on the computer performs a part or all of the actual processing based on the instruction of the program codes and implements the functions of the above exemplary embodiments. Also this case constitutes the present invention.

Followings are the examples of the storage media that store the program codes: flexible disk, hard disk, ROM, RAM, magnetic tape, and non-volatile memory card, CD-ROM, CD-R, DVD, optical disk, magnet-optical disk, and MO.

Further, after the program codes read from the storage medium are written into a memory that has been provided at a function extension unit connected to the computer or a function extension card inserted in the computer, based on the instruction of the program codes described above, the CPU provided at the functional extension unit or the function extension card described above does a part or all of the actual processing. The functions of the exemplary embodiments described above are also achieved by this processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-202254 filed Jul. 11, 2005, which is hereby incorporated by reference herein in its entirety.

What is claimed:

1. An image processing apparatus, comprising:
an acquiring unit configured to acquire an image from a scanning of a scanner having at least one original placed in a position on a platen of the scanner, wherein the image is configured to be obtained by a scanning that uses a scanning area of the platen;
a specifying unit configured to specify a number of areas that correspond to the image acquired from the at least one original by the acquiring unit using a threshold value for a detection of an edge of the at least one original, wherein the specifying unit specifies at least one area corresponding to the at least one original;
an inputting unit configured to input an input number of areas to be specified by the specifying unit, wherein the input number of areas to be specified by the specifying unit is received from a user; and
a changing unit configured to change the threshold value for a detection of the edge of the at least one original,
wherein, both in response to the number of areas which have been specified by the specifying unit being larger than the input number and in response to the number of areas which have been specified by the specifying unit being smaller than the input number, the changing unit changes the threshold value for a detection of the edge of the at least one original and the specifying unit specifies the at least one area corresponding to the at least one original based on each change in the threshold value until a number of areas specified by the specifying unit of an acquired image coincides with the input number without a change the position of the at least one original on the platen and without a change in the scanning area of the platen.

2. The image processing apparatus according to claim 1 further comprising a display control unit configured to cause a monitor to display contents according to a result of comparing the number of areas which have been specified by the specifying unit and the input number of areas to be specified by the specifying unit.

3. The image processing apparatus according to claim 1, wherein the display control unit causes a monitor to display success of a cropping process in response to the number of areas which have been specified by the specifying unit and the input number of areas to be specified by the specifying unit being the same.

4. The image processing apparatus according to claim 1, wherein the display control unit causes a monitor to display at least one of retrying of a specifying process by the specifying unit or stopping the specifying in response to the number of areas which have been specified by the specifying unit and the input number of areas to be specified by the specifying unit being different.

5. The image processing apparatus according to claim 1, wherein the display control unit causes a monitor to display a location determined to be most likely to cause detection error, based on a detecting result by a detecting unit, in response to the number of areas which have been specified by the specifying unit and the input number of areas to be specified by the specifying unit being different.

6. The image processing apparatus according to claim 1, further comprising a generating unit configured to generate an image corresponding to the number of areas which has been specified by the specifying unit,
wherein the generating unit executes a generating operation, according to a result of comparing the number of areas which have been specified by the specifying unit and the input number of areas to be specified by the specifying unit.

7. The image processing apparatus according to claim 6, wherein the generating unit generates an image that is displayed by a monitor.

8. The image processing apparatus according to claim 6, wherein the generating unit generates an image that is printed by a printer.

9. The image processing apparatus according to claim 1, wherein the specifying unit automatically changes the threshold value for a detection of the edge of the at least one original in response to the specifying being executed again by the specifying unit.

10. The image processing apparatus according to claim 1, wherein a specifying changes the threshold value for a detection of the edge of the at least one original by operation of a user.

11. The image processing apparatus according to claim 1, wherein, in response to the number of areas which have been specified by the specifying unit and the input number of areas to be specified by the specifying unit being different, the acquiring unit again acquires another image corresponding to the same scanning area of the platen again, and the specifying unit again executes the specifying again to the another image acquired by the acquiring unit.

12. An image processing method for an image processing apparatus, the method comprising:
acquiring an image from a scanning of a scanner having at least one original placed in a position on a platen of the scanner, wherein the image is configured to be obtained by a scanning that uses a scanning area of the platen;
specifying a number of areas that correspond to the image acquired from the at least one original using a threshold value for a detection of an edge of the at least one original, wherein specifying includes specifying at least one area corresponding to the at least one original;
inputting an input number of areas to be specified by the specifying, wherein the input number of areas to be specified by the specifying is received from a user; and
changing the threshold value for a detection of the edge of the at least one original,
wherein, both in response to the number of areas which have been specified being larger than the input number and in response to the number of areas which have been specified being smaller than the input number, changing includes changing the threshold value for a detection of the edge of the at least one original and specifying includes specifying the at least one area corresponding to the at least one original based on each change in the threshold value until a number of areas specified by the specifying of an acquired image coincides with the input number without a change the position of the at least one original on the platen and without a change in the scanning area of the platen.

13. The image processing apparatus according claim 1, further comprising a scan control unit configured to cause the scanner to scan the at least one original on the platen,
wherein the scan control unit stops a scanning operation by the scanner for generating image data of the image corresponding to the at least one original on the platen, according to a result of comparing the number of areas which have been specified by the specifying unit and the input number of areas to be specified by the specifying unit.

14. An image processing method according to claim 12 further comprising causing a monitor to display contents according to a result of comparing the number of areas which have been specified by the specifying unit and the input number of areas to be specified by the specifying unit.

15. The image processing method according to claim 12, further comprising generating an image corresponding to the number of areas which has been specified by the specifying unit, wherein a generating operation is executed according to a result of comparing the number of areas which have been specified by the specifying unit and the input number of areas to be specified by the specifying unit.

16. A non-transitory computer readable storage medium storing a program that causes an image processing apparatus to perform the image processing method according to claim 12.

* * * * *